United States Patent
Carlin

[11] Patent Number: 5,267,760
[45] Date of Patent: Dec. 7, 1993

[54] LOCKING MECHANISM

[75] Inventor: Robert N. Carlin, Nottingham, England

[73] Assignee: Rolls-Royce plc, London, England

[21] Appl. No.: 40,435

[22] Filed: Apr. 1, 1993

[30] Foreign Application Priority Data

May 12, 1992 [GB] United Kingdom ............... 9210205

[51] Int. Cl.[5] ............................................. E05B 47/00
[52] U.S. Cl. ......................................... 292/19; 292/201
[58] Field of Search ................... 292/19, 49, 252, 224, 292/201

[56] References Cited

U.S. PATENT DOCUMENTS

| | | | |
|---|---|---|---|
| 2,506,846 | 5/1950 | Teasdale | 292/19 X |
| 3,753,316 | 8/1973 | Savarieau et al. | 292/19 X |
| 4,057,935 | 11/1977 | Rohrberg et al. | 292/19 X |
| 5,172,945 | 12/1992 | Doherty et al. | 292/49 |

FOREIGN PATENT DOCUMENTS 1348563  3/1974  United Kingdom .

Primary Examiner—Richard E. Moore
Attorney, Agent, or Firm—Cushman, Darby & Cushman

[57] ABSTRACT

A locking mechanism comprises a plurality of spring loaded tines disposed around an armature. The armature has a disc mounted thereon the radially outer surface of which is profiled. The armature is coupled to a solenoid which is selectively energized to move the armature. In a locked position the profiled surface of the disc urges the spring loaded tines outwardly into engagement with a locking cup. In an unlocked position the armature moves the disc into a position so that the profiled surface allows the tines to spring inwardly so they can be withdrawn from the locking cup. A spring loaded sleeve is provided which holds the tines and the armature in the unlocked position so that the locking mechanism can re-engage in the event of a power failure to the solenoid. A pin is provided so that the solenoid can be overridden manually.

7 Claims, 2 Drawing Sheets

LOCKING MECHANISM

The present invention relates to a locking mechanism. In particular it relates to a locking mechanism for preventing pivotal movement of doors in the cowling of a gas turbine engine.

According to the present invention a locking mechanism comprises a plurality of spring loaded tines and biasing means for urging the spring loaded tines into contact with means for capturing the tines, the biasing means being mounted on an armature which is coupled to a solenoid, the solenoid being arranged so that in operation it is selectively energised to move the armature between a locked position in which the biasing means urges the tines into engagement with the means for capturing the tines, and an unlocked position in which the armature moves the biasing means into a position so that the tines can be withdrawn from the means for capturing the tines, a spring loaded sleeve being provided which holds the spring loaded tines and the armature in the unlocked position.

The spring loaded sleeve maintains the locking mechanism in the unlocked position so that it can re-engage should a power failure to the solenoid occur.

The tines may be made from a naturally resilient material and are preferably disposed circumferentially around the armature.

The means for biasing the tines into engagement with the means for capturing the tines may be a disc mounted on one end of the armature. The radially outer surface of the disc may be profiled so that movement of the disc relative to the spring loaded tines causes the tines to move radially inwardly or outwardly.

The locking mechanism is suitable for pivot doors of a thrust reverser in the cowling of a gas turbine engine.

The present invention will now be described by way of example and with reference to the accompanying drawings in which.

Figure 1:
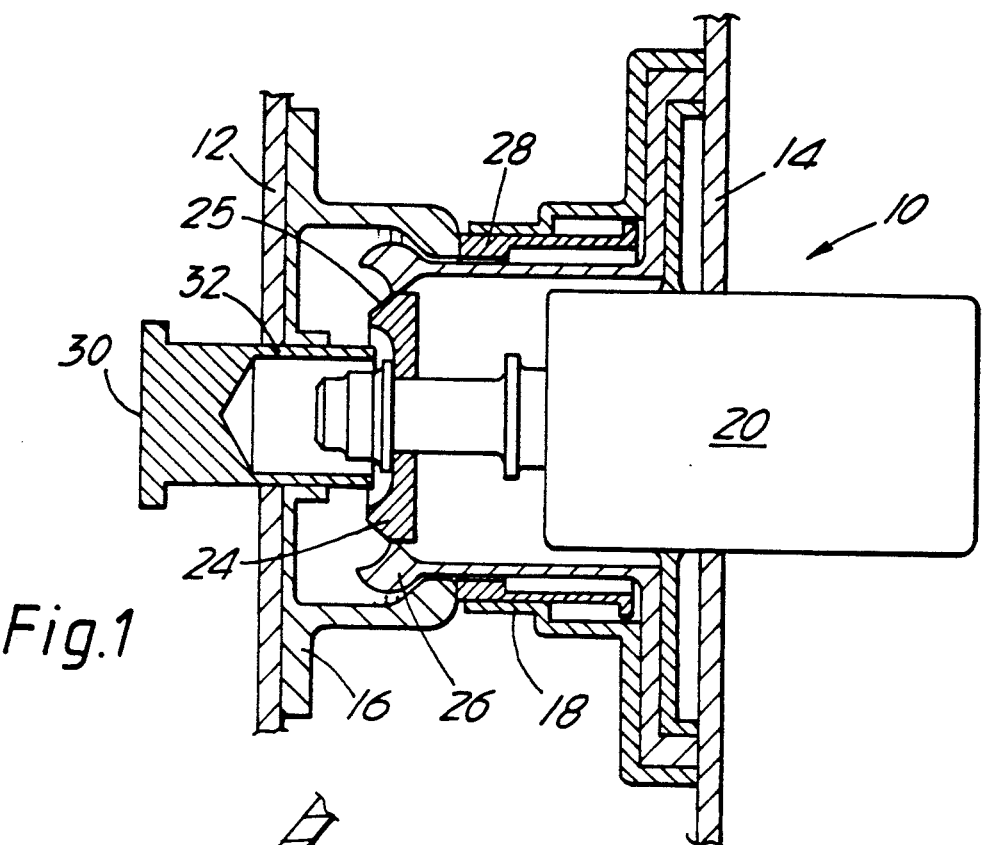
FIG. 1 is a partially cross-sectional view of a locking mechanism in accordance with the present invention in the locked position.
Figure 2:
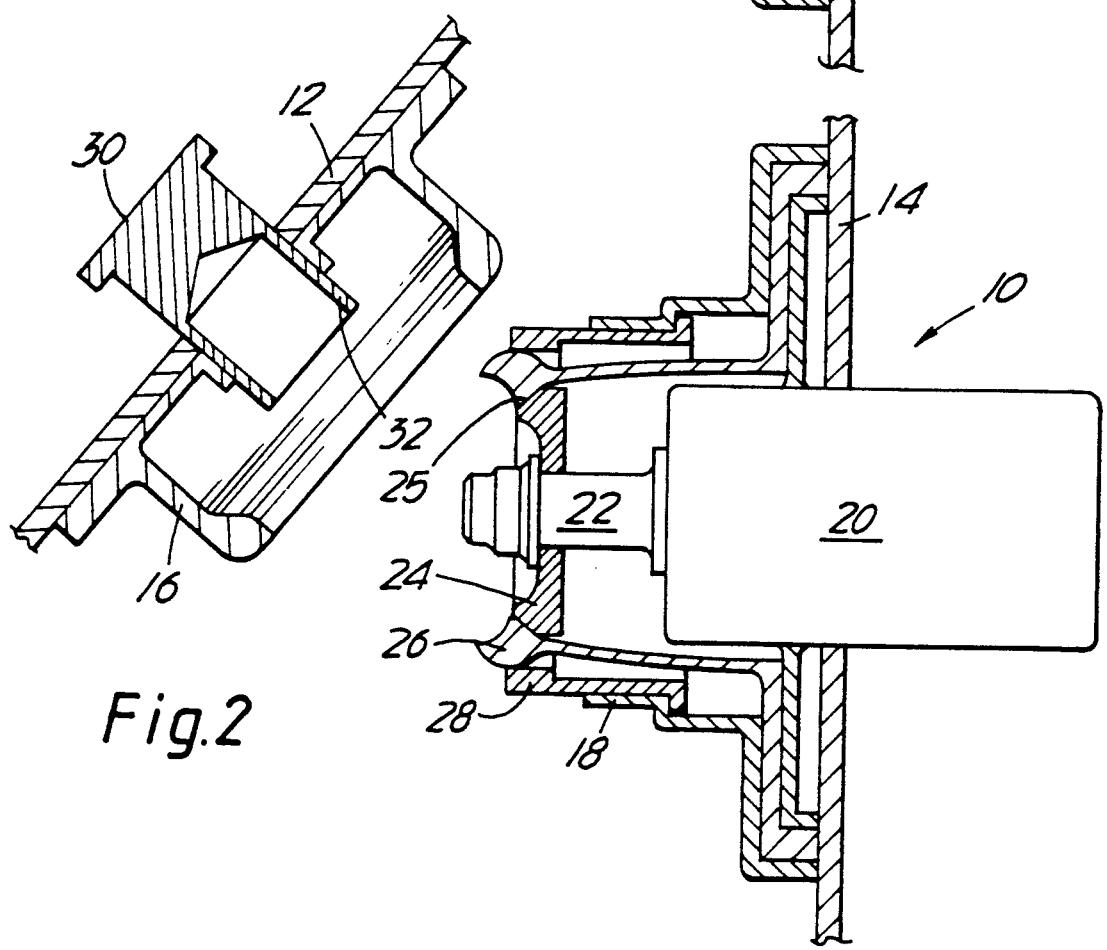
FIG. 2 is a partially cross-sectional view of a locking mechanism in accordance with the present invention in the unlocked position.

Referring to FIGS. 1 and 2 a wall 12 is capable of pivotable movement relative to a wall 14 which is static. A locking mechanism, generally indicated at 10, is provided which selectively prevents pivotal movement between the two walls 12 and 14.

The locking mechanism 10 comprises a plurality of tines 26, which are made from a naturally resilient material. The tines 26 are circumferentially disposed around a solenoid 20. The tines 26 are located around the solenoid by a housing 18 mounted on the static surface 14.

The solenoid 20 controls the axial movement of an armature 22 having a disc 24 mounted at one end thereof. The radially outer surface 25 of the disc 24 is profiled so that axial movement of the armature 22 causes the tines 26 to move radially inwardly or outwardly as they cam along the profiled surface 25 of the disc 24. Radial movement of the tines causes them to selectively engage and disengage a locking cup 16 which is mounted on the pivotable wall 12.

The solenoid 20 is selectively energised. When the solenoid 20 is not energised the armature 22 is displaced from the solenoid 20, FIG. 1. The profiled surface 25 of the disc 24 urges the tines 26 radially outward. The tines 26 engage the inner surface of the locking cup 16 mounted on the pivotable wall 12. The mechanism 10 is locked preventing pivotal movement of the wall 12 relative to the static wall 14.

When the solenoid 20 is energised the armature 22 moves axially towards the solenoid 20. The tines 26 cam along the profiled surface 25 of the disc 24. The tines 26 move radially inward and disengage from the locking cup 16. The wall 12 is now free to pivot relative to the static wall 14, FIG. 2.

In the preferred embodiment of the present invention a sleeve 28 is provided between the housing 18 and the tines 26. The sleeve 28 is spring loaded so that it can move axially relative to the tines 26.

When the mechanism 10 is locked, FIG. 1, the sleeve 28 abuts the locking cup 16. However when the mechanism 10 is unlocked, FIG. 2, pivotal movement of the wall 12 and the locking cup 16 allow the sleeve 28 to move axially relative to the tines 26. The sleeve 28 moves axially to hold the tines 26 in the radially inward position. This locks the tines 26 against the profiled surface 25 of the disc 24 and holds the armature 22 in the unlocked position. Should the power to the solenoid 20 be switched off or fail the sleeve 28 maintains the tines 26 and armature 22 in the unlocked position. Only when the wall 12 pivots so that the locking cup 16 abuts the sleeve 28 does it move axially to allow the armature 22 to move and urge the tines 26 radially outward to lock the walls 12 and 14.

The spring loaded sleeve 28 maintains the locking mechanism 10 in the unlocked position so that it can re-engage should a power failure to the solenoid 20 occur.

A cylindrical pin 32, shown in FIG. 1, projects from pivotable wall 12 into the vicinity of the disc 24 on the armature 22. When a button 30 is depressed the pin 32 moves axially into contact with the disc 24. The pin 32 applies pressure to the disc 24 to move the armature 22 towards the solenoid 20 and unlock the walls 12 and 14. The button 30 and pin 32 are used to override the solenoid 20 manually to give access through the walls 12 and 14.

Figure 3:
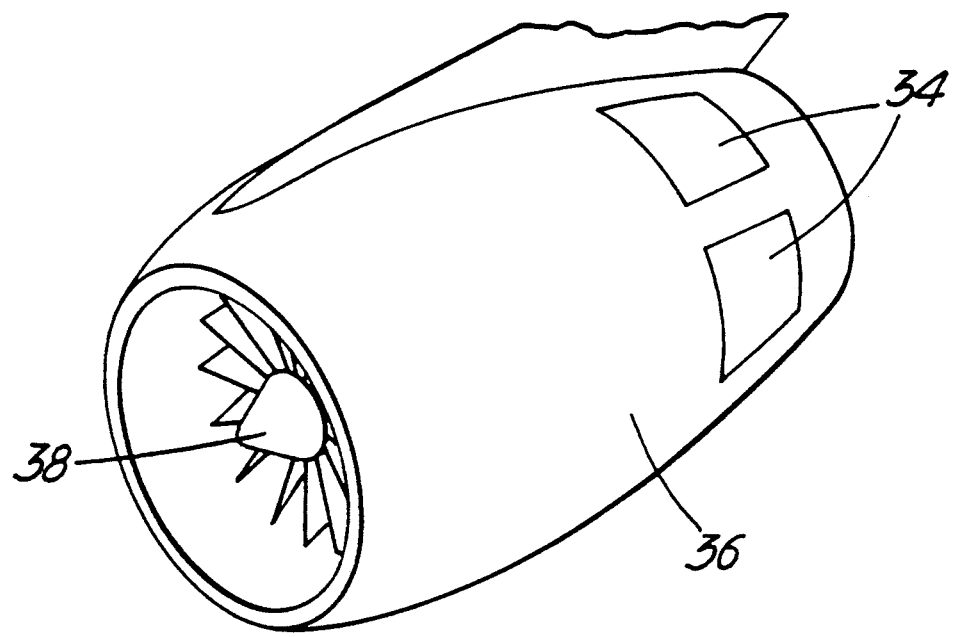
FIG. 3 is a pictorial view of a gas turbine engine having pivot doors incorporating a locking mechanism in accordance with the present invention.

One application of a locking mechanism 10 in accordance with the present invention is for selectively operating doors 34 in the cowling 36 of a gas turbine engine 38 (FIG. 3). The doors 34 are capable of pivotal movement and are provided in the cowling 36 of the gas turbine engine 38 for thrust reversal purposes. The solenoid 20 of the locking mechanism 10 in accordance with the present invention would be energised independently from other control systems which activate the doors 34. The button 30 and cylindrical pin 32 would allow the solenoid 20 to be manually overridden for maintenance and inspection of the gas turbine engine 38 through the doors 34 in the cowling 36. Incorporation of the independent locking mechanism 10 would improve safety and prevent the thrust reverser pivot doors 34 from accidentally deploying.

I claim:

1. A locking mechanism comprising a plurality of spring loaded tines and biasing means for urging the spring loaded tines into contact with a means for capturing the tines, the biasing means being mounted on an armature which is coupled to a solenoid, the solenoid being arranged so that in operation it is selectively energised to move the armature between a locked position in which the biasing means urges the tines into engagement with the means for capturing the tines, and an unlocked position in which the armature moves the biasing means into a position so that the tines can be withdrawn from the means for capturing the tines, a spring loaded sleeve being provided and shaped to hold the spring loaded tines and the armature in the unlocked position.

2. A locking mechanism as claimed in claim 1 in which the tines made from a naturally resilient material.

3. A locking mechanism as claimed in claim 1 in which the tines are disposed circumferentially around the armature.

4. A locking mechanism as claimed in claim 3 in which the means for biasing the tines into engagement with the means for capturing the tines is a disc mounted on one end of the armature.

5. A locking mechanism as claimed in claim 4 in which the radially outer surface of the disc is profiled so that movement of the disc relative to the spring loaded tines causes the tines to move radially inwardly or outwardly.

6. A locking mechanism as claimed in claim 1 with a pivot door in the cowling of a gas turbine engine.

7. A locking mechanism as claimed in claim 6 in which the pivot doors in the cowling of the gas turbine engine are constituted for thrust reversal purposes.

* * * * *